US008898767B1

(12) United States Patent  (10) Patent No.: US 8,898,767 B1
Chen et al.  (45) Date of Patent: Nov. 25, 2014

(54) METHODS AND APPARATUSES FOR DIGITAL CONTENT PROTECTION

(71) Applicant: Mountain Top Digital, L.L.C., Salt Lake City, UT (US)

(72) Inventors: Xi Chen, Midvale, UT (US); Stephen Wirthlin Gerritsen, North Ogden, UT (US)

(73) Assignee: Mountain Top Digital, L.L.C., Salt Lake City, UT (US)

( * ) Notice: Subject to any disclaimer, the term of this patent is extended or adjusted under 35 U.S.C. 154(b) by 0 days.

(21) Appl. No.: 13/624,726

(22) Filed: Sep. 21, 2012

Related U.S. Application Data

(60) Provisional application No. 61/537,733, filed on Sep. 22, 2011.

(51) Int. Cl.
*H04L 29/06* (2006.01)
*H04L 9/08* (2006.01)

(52) U.S. Cl.
CPC ............ *H04L 9/0838* (2013.01); *H04L 9/0877* (2013.01)
USPC .............................................. 726/9; 713/189

(58) Field of Classification Search
CPC .......................... H04L 9/0838; H04L 9/0877
USPC ............................................. 726/9; 713/189
See application file for complete search history.

(56) References Cited

U.S. PATENT DOCUMENTS

| 7,003,117 | B2 | 2/2006 | Kacker et al. | |
| 7,376,232 | B2 | 5/2008 | Soliman | |
| 7,688,975 | B2 | 3/2010 | Lin et al. | |
| 8,401,188 | B1 * | 3/2013 | Swaminathan et al. | 380/217 |
| 2007/0226520 | A1 * | 9/2007 | Kuroda | 713/193 |

OTHER PUBLICATIONS

Kesden, Lecture 33, Dec. 6, 2000, http://www.cs.cmu.edu/~dst/DeCSS/Kesden/index.html, website retrieved Sep. 21, 2012, 12 pages.
iLok homepage, http://www.ilok.com/, website retrieved Sep. 21, 2012, 3 pages.
Imation, USB Flash Drive Encryption Software, http://www.encryptx.com/products/usb-flash-drive-encryption.php, website retrieved Sep. 21, 2012, 2 pages.

\* cited by examiner

*Primary Examiner* — Pramila Parthasarathy
(74) *Attorney, Agent, or Firm* — TraskBritt (57) ABSTRACT

A method for digital content protection comprises generating a plurality of frame keys, retrieving a plurality of frames from digital content, and at least one of encrypting and decrypting the digital content with a different frame key that dynamically changes for each frame of the plurality of frames. A storage device comprises a computer-readable medium including encrypted digital content stored thereon, wherein the encrypted digital content is encrypted with a frame key that is different for each frame of the encrypted digital content. A content player comprises a computer-readable medium including instructions stored thereon, that when executed cause a processor to decrypt encrypted digital content by reconstructing a plurality of frame keys that are different from each other that are used to decrypt each frame of the encrypted digital content.

18 Claims, 5 Drawing Sheets

METHODS AND APPARATUSES FOR DIGITAL CONTENT PROTECTION

CROSS-REFERENCE TO RELATED APPLICATION

This application claims the benefit of U.S. Provisional Patent Application Ser. No. 61/537,733, filed Sep. 22, 2011, and entitled "Novel Method of Encryption for Data Stored on USB, SD, Hard Drives, or Other Portable Memory Devices, the entire disclosure of which is hereby incorporated herein by this reference.

FIELD

The present disclosure generally relates to security of digital content. More particularly, embodiments of the present disclosure relate to encryption and decryption of digital content as well as the delivery, storage, and access of such encrypted digital content.

BACKGROUND

Storing and transmitting content, such as songs, video, and other data in digital form has become commonplace as the use of various electronic devices is more ubiquitous, and as delivery of such digital content becomes more convenient. Distributing digital content to users may pose security issues, including confidentiality and copyright protection issues. Various methods of data encryption have been developed to offer secure methods of authorized storing and transportation of digital content to users.

Conventional digital rights management systems expose security holes that are frequently used by attackers to invade the security system, which may result in illegally obtaining digital content. The security layers for media, such as DVDs and Blu-ray discs, have various defects that allow attackers to obtain the encryption key with relative ease. For example, with conventional encryption methods, the memory block that stores the encryption key to the encrypted content is often not protected. As a result, memory snooping attacks may result in the encryption key being discovered. Attackers often scan memory blocks within the hardware that decrypts such content to search for the encryption key.

Once the encryption key is discovered, the digital content may be accessed and/or copied by unauthorized parties. Because the storage media (e.g., DVDs) often are mass produced, each media device may include the same encryption key for identical digital content. As a result, once one attacker is able to "crack" the DVD and obtain the encryption key, the attacker can easily share the encryption key for others to do the same for their copies. In addition, if the security layer is compromised for one of the media devices, it may be difficult to ascertain information regarding the offending media device or the user using the conventional encryption methods.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the claimed invention is defined only by the appended claims and their legal equivalents.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration. A computer-readable medium may include storage media, such as ROMs, EPROMs, EEPROMs, Flash memories, optical disks, and other storage devices.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Embodiments of the present disclosure may enable digital content owners to offer digital content to a user for storing, delivery, and other access. Thus, embodiments of the present disclosure may support one or more of the following business models: safe and secure rental of digital content, sale or subscription services of digital content including online streaming of digital content, and safe and secure controlled sharing of digital content. When the user downloads the digital content to a physical storage device, encryption authentication and authorization software may also be downloaded with the digital content. As a result, digital content owners in a variety of different industries may distribute their digital content in a way that may reduce the risk of digital piracy while helping to increase their content selection they are able to offer. In some embodiments, the authentication and authorization software may require the use of a storage device that is pre-registered with the user's account. In some embodiments, the storage device may be registered with the user's account at the time of content storage. Distribution of the digital content may be secure, and authorized use of the digital content may be enhanced, while reducing the risk of theft or loss.

Embodiments of the present disclosure may further include a frame key that is used to encrypt frames of the digital content. As used herein, a "frame" is intended to refer to a portion of the digital content. Using the term "frame" is not intended to imply that the digital content is limited to video content, unless specifically described as such. The frame key may dynamically change for each frame of the digital content.

Figure 1:
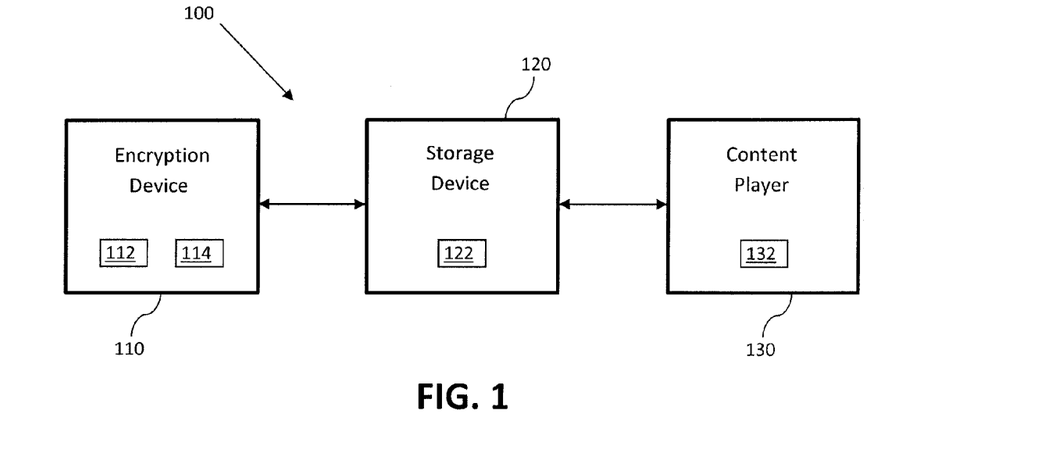
FIG. 1 is a block diagram of a digital content delivery system according to an embodiment of the present disclosure.

FIG. 1 is a block diagram of a digital content delivery system 100 according to an embodiment of the present disclosure. The digital content delivery system 100 may include an encryption device 110, a storage device 120, and a content player 130. The encryption device 110 may be configured to provide the storage device 120 with encrypted digital content. The encrypted digital content may be stored on the storage device 120. The encrypted digital content may be decrypted and played by the content player 130.

Digital content may include video content, audio content, electronic book (eBook) content, video game content, software, and various documents (e.g., financial records, health records, government records, military records, business documents, etc.). As a result, embodiments of the present disclosure may assist a variety of industries (e.g., entertainment industry, motion picture industry, television industry, music industry, health care industry, finance industry, publishing industry, eBook industry, software industry, among others) in protecting content from unauthorized access, such as viewing, copying, or sharing the digital content.

The encryption device 110 may include a processor 112 coupled with a computer-readable medium 114. The computer-readable medium 114 may have instructions stored thereon, which may be executed by the processor 112. The instructions may cause the processor to perform one or more of the operations described below relating to providing encrypted digital content to the storage device 120. The encryption device 110 may include a computer, a server, a kiosk, or other similar device for encrypting digital content and providing encrypted digital content to another device.

The digital content may be stored in a cloud environment, a local network environment, a kiosk, or other location for the user to access and download onto the storage device 120.

The storage device 120 may include a computer-readable medium 122 configured to store the encrypted digital content from the encryption device 110. For example, the storage device 120 may include a Flash memory drive (e.g., USB Flash memory), a secure digital (SD) memory card, a hard drive, an optical disc (e.g., DVD, Blu-Ray), etc.

The content player 130 may be a device configured to read the storage device 120, decrypt the encrypted digital content, and reproduce the digital content for the user. For example, the content player 130 may include a computer-readable medium 132 that includes instructions stored thereon, which may cause a processor to perform one or more of the operations described below relating to the decryption of encrypted digital content. In some embodiments, the computer-readable medium 132 may include a software application stored thereon configured to read, decrypt, and reproduce the digital content. The user may also download and store a plug-in in the computer-readable medium 132, the plug-in being configured to enable a larger software application (e.g., such as those commonly found in commercial digital content readers and players) to perform the decryption methods described herein. In addition, the content player 130 may include a display for displaying the reproduced digital content. Depending on the type of digital content, the content player 130 may include a personal computer, television, set top box, laptop computer, tablet computer, cellular phone, smart phone, eBook reader, audio player, gaming device, etc.

In some embodiments, the storage device 120 and the content player 130 may be separate devices, such as the storage device 120 being a USB Flash memory drive and the content player 130 being a personal computer that may receive the storage device 120 and read the digital content stored thereon. In some embodiments, the storage device 120 and the content player 130 may be integrally within the same form factor. For example, the storage device 120 may be internal memory as part of a smart phone, a tablet computer (content player 130), a hard drive of a computer, or other similar device. In some embodiments, the encryption device 110, the storage device 120, and the content player 130 may all be formed integrally within the same form factor.

Figure 2:
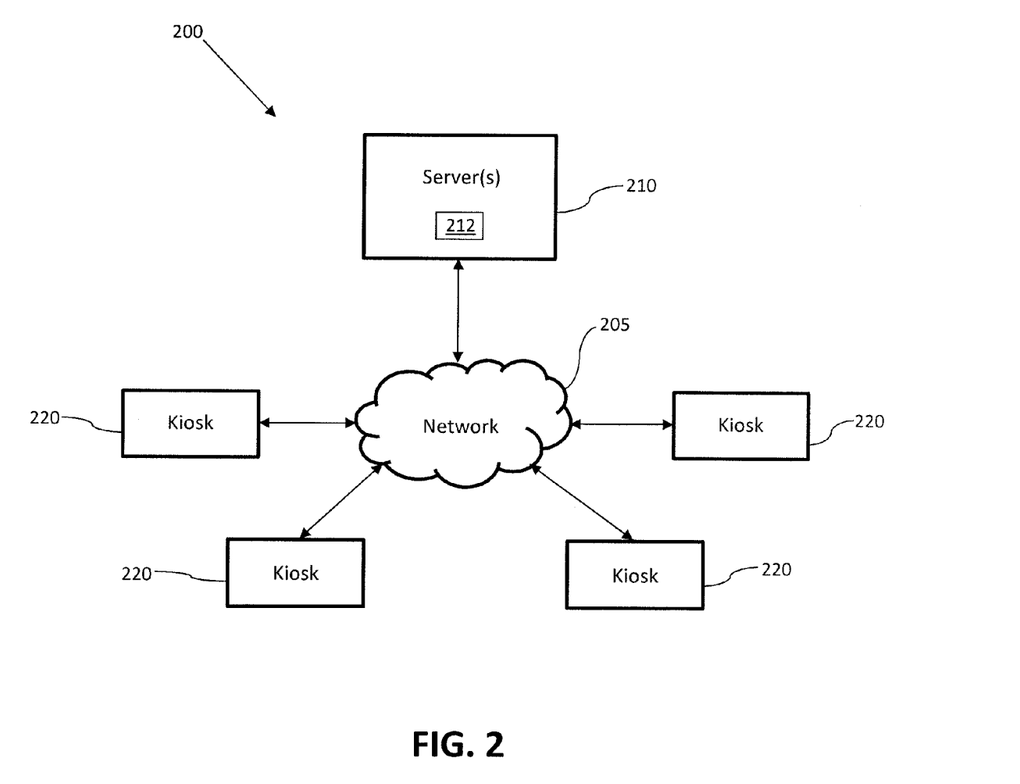
FIG. 2 is a block diagram of a digital content delivery system according to an embodiment of the present disclosure.

FIG. 2 is a block diagram of a digital content delivery system 200 according to an embodiment of the present disclosure. The digital content delivery system 200 may include one or more servers 210 that are coupled with a plurality of kiosks 220 through a network 205. Each kiosk 220 may be located at various locations for a user to receive the digital content. For example, the kiosks 220 may be located at supermarkets, gas stations, restaurants, shopping centers, etc.

The server 210 may distribute digital content to each kiosk 220. Thus, in some embodiments, the kiosks 220 may hold the preliminary digital content. A user may insert a storage device 120 (FIG. 1) into the kiosk 220 to receive digital content. The server 210 may maintain a user database 212 that includes user information, such as customer licenses, name, address, payment information, etc., associated with a user. As a result, a user may access the digital content delivery system 200 through any of the kiosks 220.

As an example, and referring to FIGS. 1 and 2, the user may insert the storage device 120 to purchase or rent a movie. The kiosk 220 may read user information (if any) from the storage device 120. The kiosk 220 may access the database 212 (or a local version stored on the kiosk 220) access the user account associated with the particular storage device 120. If the storage device 120 is not associated with an existing user account, the user may be required to open a user account prior to receiving any digital content from the kiosk 220. If a user account is authenticated for the storage device 120, the digital content may be provided from the kiosk 220 to the storage device 120. The digital content may be encrypted according to embodiments described more fully below.

Additional configurations for digital content delivery systems are also contemplated. For example, rather than having a kiosk-based system that requires the user to find a kiosk at a specific location, embodiments of the present disclosure may enable users to access a web-based digital content delivery system or other online streaming applications. In such a web-based content delivery system, a user may insert their storage device 120 into a computer connected to the Internet (e.g., their home computer). The user's account may be authenticated, after which the user may be access their user account and other content through a website. Through such a website, the user may select digital content to download to the storage device 120. When the digital content is downloaded to the storage device 120, the digital content may be encrypted and stored on the storage device 120. The digital content may be encrypted on the server 210 before being downloaded to the storage device 120. In other words, the full digital content may be encrypted on the server 210 and then transmitted to the storage device 120. When the digital content is accessed from the storage device 120, the digital content may be decrypted by the content player 130. Encryption and decryption of the digital content may be described more fully below with respect to FIGS. 3-6.

In some embodiments, the storage device 120 may be memory on a computing device rather than a separate storage device. For example, a user may simply use a smart phone, a tablet computer, a personal computer, etc., with an internal hard drive as the storage device 120 to access a web-based content delivery system to download digital content to the device. Accessing the web-based content delivery system may occur through a web site as discussed above, or through an application stored on the device that provides access to the digital content and user account information.

Embodiments of the present disclosure may include accessing encrypted digital content for a variety of different settings. For example, consumer settings may be as discussed above (e.g., kiosks, web-enabled devices, etc.). In other embodiments, commercial settings are also contemplated. For example, a movie studio may desire to distribute digital movie content to movie theaters around the world. The movie studio may deliver a portable hard drive to the movie theater with the digital movie content. In such embodiments, the digital movie content may be encrypted on the hard drive prior to being delivered to the theater. In some embodiments, commercial users, such as movie theaters, may be provided access to download encrypted digital content using an online account.

Figure 3:
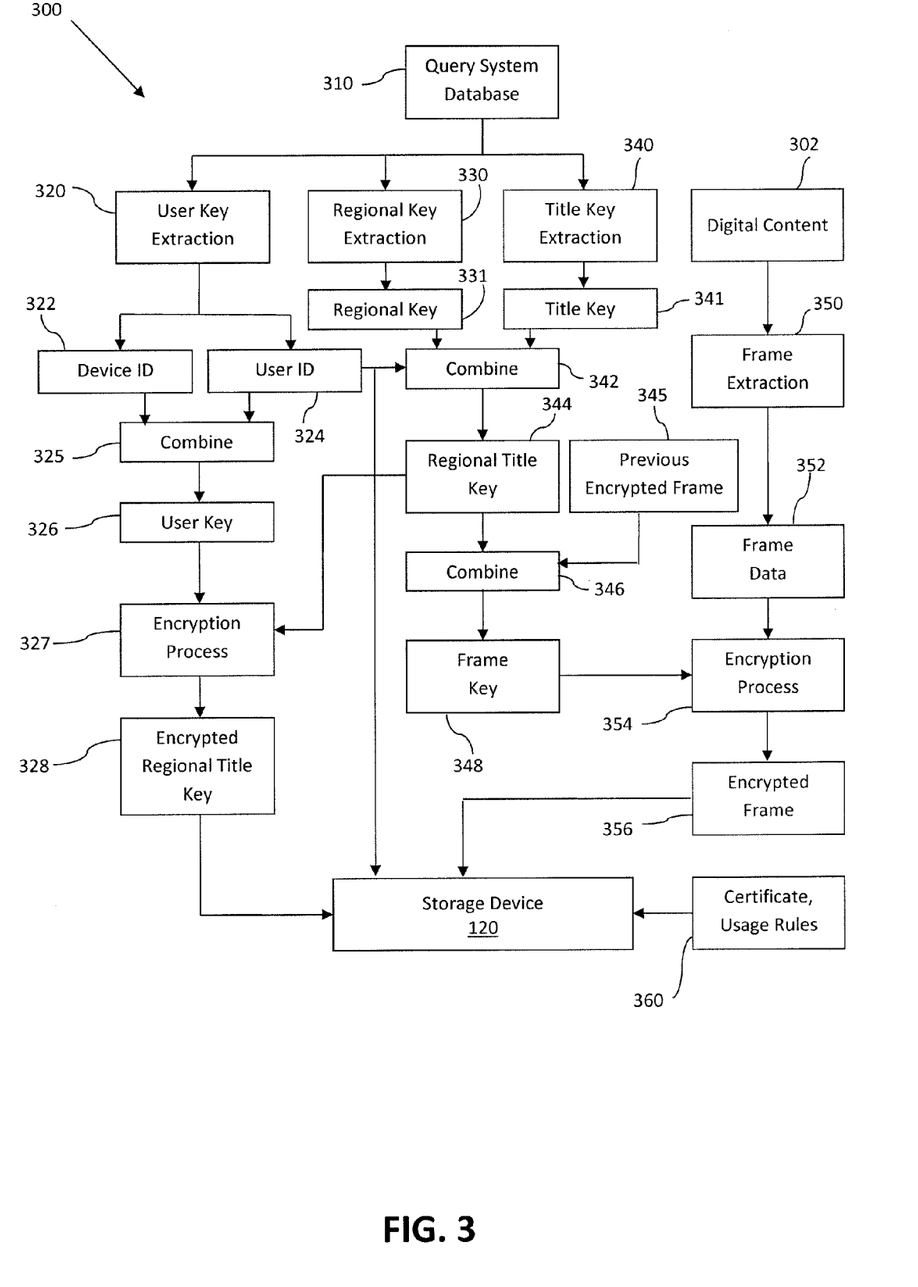
FIG. 3 is a block diagram illustrating a method for encrypting digital content according to an embodiment of the present disclosure.

FIG. 3 is a block diagram 300 illustrating a method for encrypting digital content 302 according to an embodiment of the present disclosure. The encryption method provides for user authentication and authorization in order to reduce or eliminate unauthorized access of the digital content 302. As a result, the distribution of the digital content 302 may be secured.

The method for encrypting digital content 302 may include a unique security layer that may be enforced with one or more of the following keys: a title key 341, a regional key 331, and a user key 326. The title key 341 includes an identifier associated with a particular title of the digital content 302. For example, a particular movie (e.g., "Star Wars") may have a title key 341 associated therewith. The title key 341 may be common for each version of the digital content of the same title. In other words, each instance of the digital content 302 for a particular title may have the same title key 341. Thus, the title key 341 for digital content 302 of a first title (e.g., "Star Wars") may be different than the title key 341 used for the digital content 302 of a second title (e.g., "Lord of the Rings").

The regional key 331 includes an identifier associated with a particular geographic location of the user of the digital content 302. For example, the regional key 331 may be based on a region in which the digital content 302 is downloaded to the storage device 120. In other words, the downloads for a common region may share a regional key 331. A common region may be, for example, a city, a state, a zip code, an area code, a province, or other defined areas as desired by the content provider. When the user downloads the digital content 302 to the storage device 120, the region of the user may be determined. The region may be determined based on the known fixed location of a kiosk 220 (FIG. 2), the area code of a phone number of the user, the current global positioning system (GPS) coordinates of a device, an IP address, an address of the user registered in the user account, or other methods to determine the region where the user is located or where the download occurred. In some embodiments, each kiosk 220 may have its own unique identifier that is used as the regional key 331.

The user key 326 includes an identifier associated with a particular user of the digital content 302. Each user may be assigned a unique identifier that is different than the other potential users. The user key 326 may include an identifier that is device specific, such that each storage device 120 may have a user key 326 associated therewith even if the same user has more than one storage device 120. The device-specific identifier may include a device serial code that is stored in the storage device 120. In some embodiments, the user key 326 may include a combination of both a device-specific identifier and a user-specific identifier. For example, the user key 326 may include a combination of a device ID 322 and a user ID 324.

Referring now more specifically to FIG. 3, a user may desire to download or stream the digital content 302. As discussed above, the user may access the digital content 302 through a website, an application, a kiosk 220 or other interface in order to download the digital content 302 to a storage device 120 (e.g., USB Flash memory device, SD card, smart-phone, tablet computer, laptop, television, personal computer, etc.).

At operation 310, the content management system database may be queried. For example, the content management system database may include information regarding user accounts, storage device information, the region for the user, and information regarding the title (i.e., digital content) to be downloaded.

At operation 320, a user key extraction process may be initiated to generate a user key 326. The user key 326 may include an indicator related to the intended user of the digital content. In some embodiments, a device ID 322 and a user ID 324 may be combined (operation 325) to form the user key 326. As a non-limiting example, the combination of the device ID 322 and the user ID 324 may include performing an XOR function of the device ID 322 and the user ID 324. Other logic functions are also contemplated.

The device ID 322 may be a device-specific identifier for the storage device 120. For example, a USB Flash drive may have a device serial number unique to the device, which is stored in memory (in the ROM) by the device manufacturer and may be retrieved as the device ID 322. The user ID 324 may be a unique identifier associated with a particular user. Each of the device ID 322 and the user ID 324 may be hashed. In other words, the device ID 322 and the user ID 324 may be processed using a specific hash function for additional protection.

When each user establishes a user account and registers a storage device 120, the user may be assigned a user ID 324. In some embodiments, a user account may include have a plurality of storage devices 120 registered to the user account. In other embodiments, each user account may be allowed to have only a single storage device 120 associated registered per user account.

In some embodiments, the storage device 120 may be pre-formatted and loaded with the user ID 324 for a particular user. In other words, the content provider may issue storage devices 120 that are already formatted for storing the encrypted digital content. In some embodiments, the user may use an arbitrary storage device 120 that is not pre-formatted. Thus, during user key extraction process of operation 320, it may be determined that the storage device 120 has not yet been formatted to include the user ID 324, which may be remedied by formatting the arbitrary storage device 120 to include the user ID 324 for the particular user.

As described above, the device ID 322 may be a hardware serial code that may not be the result of formatting by the content provider, while the user ID 324 may be the result of formatting by the content provider. As a result, the user ID 324 may be revoked by the content provider if desired, while the device ID 322 may remain fixed in the storage device 120.

In some embodiments, the encryption method using the regional title key 344 may be performed on the fly at the time that the digital content 302 is provided to the user. For example, the user may select digital content to download from a kiosk, over the Internet, etc. In some embodiments, the encryption method using the regional title key 344 may first encrypt and store the encrypted digital content on a storage device 120 that is then delivered to the user. For example, a hard drive may be loaded with encrypted digital content for one or more movies, and then the hard drive may be delivered to a movie theater. The content provider may assign each movie theater with its own unique user ID 324. As a result, the hard drive may be loaded with a regional title key 344 that includes a multi-tier key that includes the user ID 324, the regional key 331, and the title key 341. Thus, if information regarding the encrypted digital content were leaked, the specific movie theater where the content was leaked may be determined.

At operation 330, a regional key extraction process may be initiated to generate a regional key 331. The regional key 331 may include an identifier associated with a particular geographic location of the user of the digital content. The regional key 331 may be determined from information stored in the user account, the system database, or by determining the region based on other factors (e.g., current GPS location). At operation 340, a title key extraction process may be initiated to generate a title key 341. The title key 341 may include an identifier associated with a particular title of the digital content. The title key 341 may be determined by querying the system database to obtain the unique title key associated with the digital content 302 selected by the user.

The regional key 331 and the title key 341 combine (operation 342) to form a regional title key 344. Combining the regional key 331 and the title key 341 may occur through an XOR function as one non-limiting example of a combining operation. In some embodiments, the user ID 324 may also combine with the regional key 331 and the title key 341 to form the regional title key 344. As a result, the regional title key 344 may include the user ID 324 embedded therein, and the regional title key 344 may be unique for each user. Combining the user ID 324 with the regional key 331 and the title key 341 may occur through a first XOR function, or other suitable combination, of the user ID 324 and the regional key 331 and a second XOR function, or other suitable combination, with the title key 341. The user ID 324 may be stored in the storage device 120 for extraction during decryption.

The user key 326 may be used to encrypt the regional title key 344 through an encryption process 327 to generate an encrypted regional title key 328. The encryption process 327 may include an encryption algorithm, such as, for example, Advanced Encryption Standard (AES) algorithm. It is contemplated that the encryption process 327 be implemented using encryption techniques, such as 128 bit, 256 bit, etc. The encrypted regional title key 328 may be stored in the storage device 120 for extraction during decryption.

The regional title key 344 may also be used to generate a frame key 348. The frame key 348 may be used to encrypt the frame data 352 through an encryption process 354. The frame key 348 may dynamically change throughout the encryption process 354 for each frame data 352. In other words, the frame key 348 may change for each frame of the frame data 352 that is encrypted. For example, the frame key 348 used to encrypt the first frame may be different than the frame key 348 used to encrypt the second frame, and so on. The encryption process 354 may employ a variety of different encryption techniques (e.g., AES). The encrypted frames 356 may be stored in the storage device 120.

The digital content 302 may be encrypted based on a plurality of frame keys generated from the digital content itself. As an example, the regional title key 344 may be combined (operation 346) with previous encrypted frames 345 to generate the frame key 348. The combination of the previous encrypted frame 345 and the regional title key 344 may be implemented using an XOR function. In some embodiments, the data used from the previous encrypted frame 345 may not necessarily be the entire previous encrypted frame. Rather, the data from the previous encrypted frame 345 that is used to generate the frame key 348 may be a selected subset of data (e.g., 128 bits) from the previous encrypted frame 345.

The frame data 352 may be generated from a frame extraction procedure 350 of the digital content 302. The frame key 348 may then be used to encrypt the each individual frame data 352 rather than the digital content 302 as a whole. As a result, the encryption process 354 may generate the encrypted frames 356. A previous encrypted frame 345 may be combined with the regional title key 344 to form each frame key 348 used in the encryption process 354. In some embodiments, the previous encrypted frame 345 may be the encrypted frame 356 that was encrypted immediately prior to the frame data 352 that is encrypted. In other words, the frame data 352 may be encrypted 354 using a frame key 348 that includes the previous encrypted frame 345 that was just previously encrypted. The previous encrypted frame 345 may be extracted from the storage device 120 when needed for operation 346. In some embodiments, the previous encrypted frame 345 may be any previously encrypted frame according to a rule governing the encryption. For example, if additional delay is desired during the encryption, the previous encrypted frame 345 may be more than one encrypted frame 356 prior to the frame data 352 being encrypted. In addition, when encrypting the first frame data of the digital content 302, there may not yet exist a previous encrypted frame 345. In such a situation, the regional title key 344 alone may be used as the frame key 348 for the first frame data 352 of the digital content.

Because each previous encoded frame 345 is combined with the regional title key 344 to generate the frame key 348, the frame key 348 is unique for each frame of the digital content. As a result, the encryption and decryption devices that access the content on the storage device storage device 120 may not have a fixed key sitting in memory as is the case with conventional encryption methods. Rather, the frame key 348 is a dynamic key that is generated for each frame data 352 that is encrypted. In addition, each frame key 348 may not even need to be stored on the storage device 120. For example, a refresh algorithm may be used to generate a frame key 348 for each frame dynamically in order to encrypt and decrypt each frame of the digital content 302. During encryption and decryption, the frame key 348 may be constantly refreshing. As a result, if an attacker were to scan the memory cache (i.e., memory snooping) for the frame key 348 when not in use, the frame key 348 itself would not be available. In addition, during encryption or decryption, the attacker may have greater difficulty detecting a pattern in the block of memory than with the situation of using a static key as in conventional encryption methods.

In some embodiments, the storage device 120 may also be loaded with certificates and/or usage rules 360 that may restrict the use of the encrypted digital content according to some criteria. For example, in situations where renting the digital content 302 rather than owning the digital content 302 is desired, one criteria of the usage rules 360 may be the amount of time (e.g., 5 days) that the encrypted digital content may be available to the user. It is contemplated that other usage rules 360 may exist. For example, a restriction may be placed on the number of times, frequency, etc. that the encrypted digital content may be accessed.

Because the regional title key 344 is generated using a user ID 324, information regarding the user and/or storage device 120 may be embedded with the encrypted digital content. As a result, each storage device 120 may have customized encryption keys rather than being mass produced on a large scale. Because the frame key 348 and the encrypted regional title key 328 may include the user ID 324, a specific "traitor" may be identified. A traitor may be a user who may contribute to unauthorized access or copying of the encrypted digital content. For example, the content provider may obtain the compromised digital content and reverse the process to discover which user contributed to the digital content being compromised. For example, comparing the extracted user ID 324 against the system database may narrow the traitor down to a single user.

For embodiments using the device ID 322 in the encryption, even if the user ID 324 and the method for generating the frame key 348 were cracked, the encrypted digital content would not decrypt on a different device because the different device would have a different device ID 322. For example, if someone were to hack the digital content 302 and load on a second device, the second device and the first device would have different device IDs 322. As a result, the user key 326 for the second device would not match the user key 326 for the first device, which may result in the encrypted data content not being readable on the second device.

Figure 4:
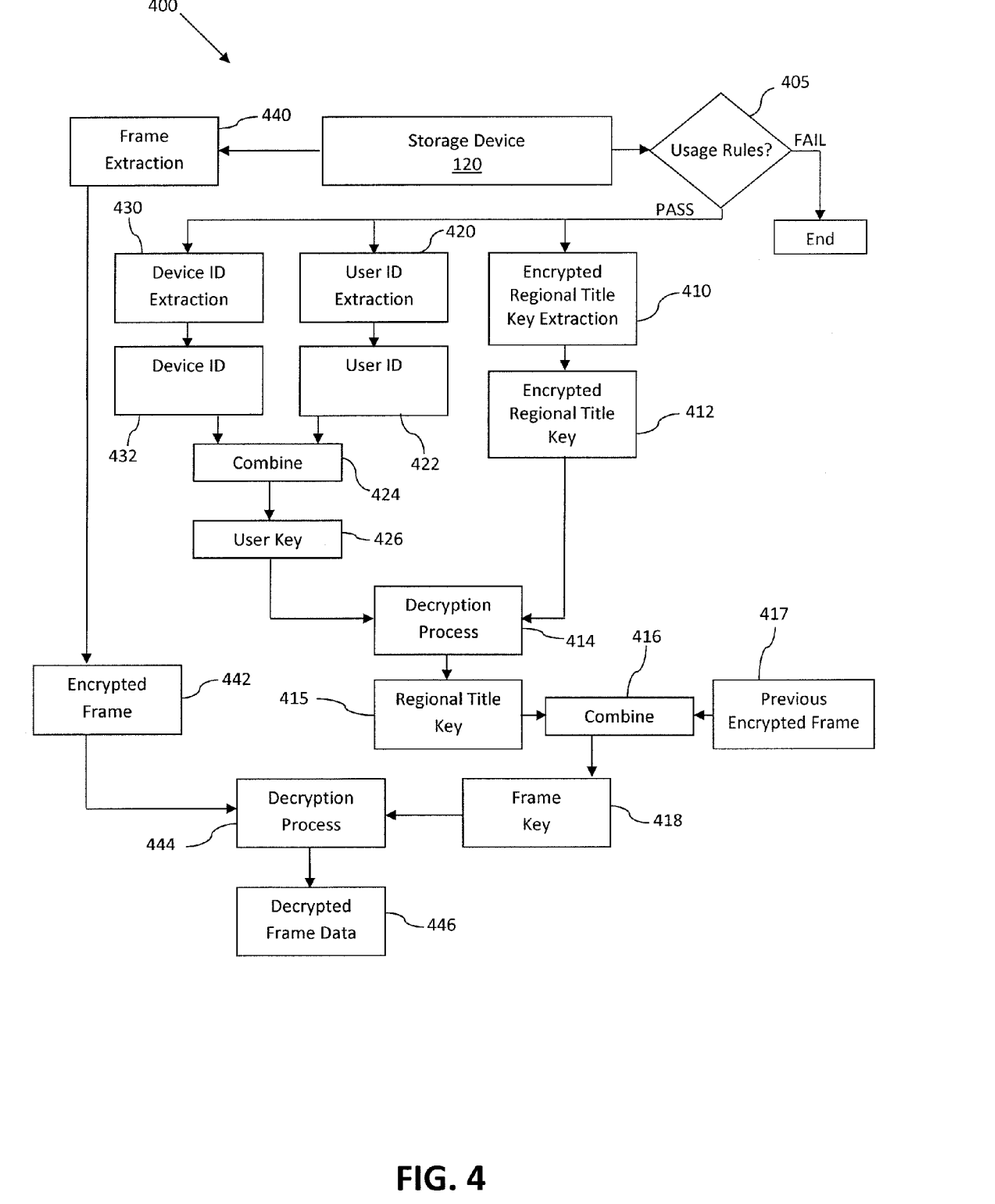
FIG. 4 is a block diagram illustrating a method for decrypting encrypted digital content according to an embodiment of the present disclosure.

FIG. 4 is a block diagram 400 illustrating a method for decrypting encrypted digital content according to an embodiment of the present disclosure. The encrypted digital content may be encrypted according to embodiments of the present disclosure and stored in the storage device 120. The decryption method may be implemented with a content player 130 (FIG. 1). For example, the content player 130 may include a software application (and in some embodiments an additional plug-in) that is configured to perform the decryption method.

In some embodiments, the decryption method used may be approximately the reverse of the encryption method used. For example, the decryption method in FIG. 4 may be used as a decryption method for encrypted digital content that is encrypted by the encryption method of FIG. 3.

At operation 405, usage rules may be examined to determine if the usage rules permit decryption of the encrypted digital content. As discussed above, usage rules may place limits on the availability of the digital content to a user. If the usage rules do not permit decryption, the method may end. If the usage rules do permit decryption, the following decryption method may begin.

At operation 410, the encrypted regional title key 412 may be extracted from the storage device 120. As discussed above, the encrypted regional title key 412 may have been stored on the storage device 120 during encryption. In addition, the regional title key 412 may include a combination of a region key, a title key, and a user ID.

At operation 420, the user ID 422 may be extracted from the storage device 120. As discussed above, the user ID 422 may have been stored on the storage device 120 during encryption. The user ID 422 may be a unique identifier associated with a specific user. The user ID 422 may be assigned to a user when the user creates a user account, and may be stored on the storage device 120 during formatting of the storage device 120. As discussed with respect to FIG. 3, the user ID 422 may have been hashed during the encryption process. As a result, the user ID 422 may also be hashed when retrieved from the storage device 120 during the decryption process as well.

At operation 430, the device ID 432 may be extracted from the storage device 120. As discussed above, the device ID 432 may have been stored on the storage device 120 during the manufacturing process of the storage device 120. The device ID 432 may be a unique identifier associated with the storage device 120 itself, such as a device serial code prewritten in the ROM section of the storage device 120 by the manufacturer. As discussed with respect to FIG. 3, the device ID 432 may have been hashed when being used to combine with the user ID 422 and/or the other keys. Because in some embodiments the device ID 432 may be stored in the storage device by the manufacturer and not the content provider, the device ID 432 may not be hashed as stored in the storage device 120. In such an embodiment, the device ID 432 may also need to be hashed during the decryption process to match the encryption process.

At operation 440, the frames may be extracted from the digital content to obtain encrypted frames. The encrypted frames may be retrieved one by one to be decrypted individually and to generate decrypted frame data 446.

The user ID 422 and the device ID 432 may be combined (e.g., operation 424) to generate a user key 426. The user key 426 and the encrypted regional title key 412 may be decrypted (e.g., through decryption process 414) to generate the regional title key 415. The decryption process 414 may be a reverse of the encryption process 327 (FIG. 3) used to generate the encrypted regional title key 412. Thus, the decryption process 414 (and decryption process 444) may employ a reverse AES function.

The regional title key 415 and the previous encrypted frame 417 may be combined (operation 416) to generate frame key 418 that is used for decrypting (e.g., through decryption process 444) current encrypted frame 442. As a result, the decrypted frame data 446 may be generated.

As with the encryption process, the frame key 418 may be dynamically generated rather than having a static key used for decryption. The frame key 418 may be generated on the fly during the decryption method rather than being saved in the decrypting device. As a result, memory snooping to recover the frame key 418 may be less successful than conventional methods.

In addition, the frame key 418 may be reconstructed from the encrypted digital content. For example, the frame key 418 used for decryption may be based on the digital content itself as the previous encrypted frame 417 may be used to generate a new frame key 418 for decryption of each encrypted frame. In some embodiments, the previous encrypted frame 417 may be the encrypted frame that is immediately prior to the current encrypted frame 442 being decrypted, or some other separation between the two. In addition, the first frame key 418 used may be the regional title key 415 alone as there would be no previous encrypted frame 417 available.

Figure 5:
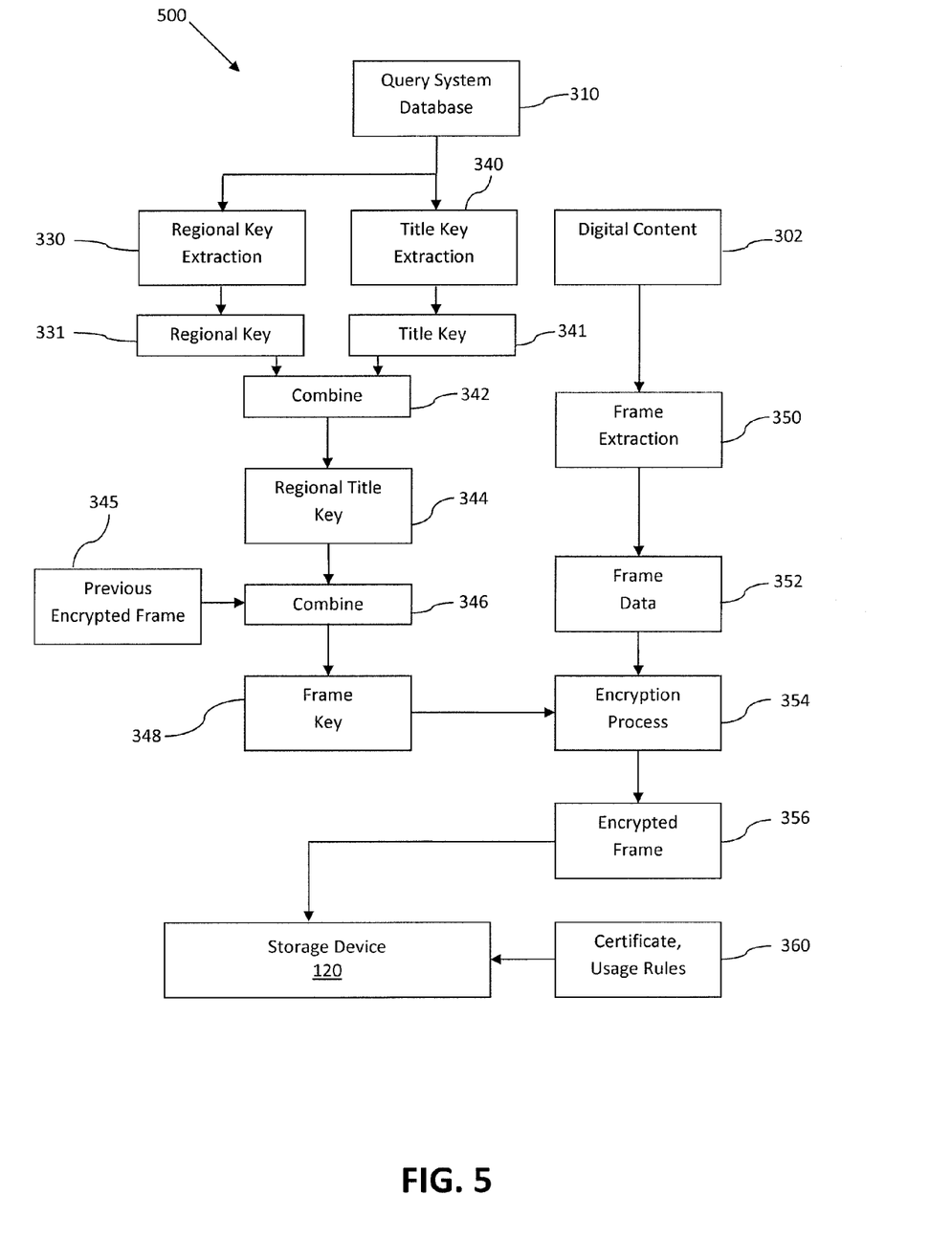
FIG. 5 is a block diagram illustrating a method for encrypting digital content according to an embodiment of the present disclosure.

FIG. 5 is a block diagram 500 illustrating a method for encrypting digital content 502 according to an embodiment of the present disclosure. The encryption method of FIG. 5 may include operations similar to those discussed above with respect to FIG. 3. The difference between the encryption method of FIG. 5 compared with FIG. 3 is that the block diagram 500 does not include the portions pertaining to the user ID and device ID. As a result, the regional title key 344 may not include the user ID. The encryption method of FIG. 5 does show the frame key 348 that may be generated based on the digital content 302 itself, such as, for example, by combining the regional title key 344 with previous encrypted frames 345.

Such an embodiment may be desired if the encryption of the frame data is performed at a point in time other than the actual downloading the digital content 302 to the storage device 102. For example, one potential drawback from such an embodiment is that the ability to narrow a traitor to a single individual user may be lost. However, the regional key 331 may include a region that is narrow enough to obtain a manageable list of users who may be the traitor. In other words, a region for the traitor may be determined and the content provider (or other entity) may query the system database to determine which users are in that region, and which other those users have downloaded the digital content 302 (e.g., title) that has been compromised. For example, it may be known which defined region in which the user was located to load the digital content 302. As a result, the system database may be queried to identify each of the users in that region who may have downloaded that title. From that list, a relatively small list of possible offenders may be created for further investigation.

Figure 6:
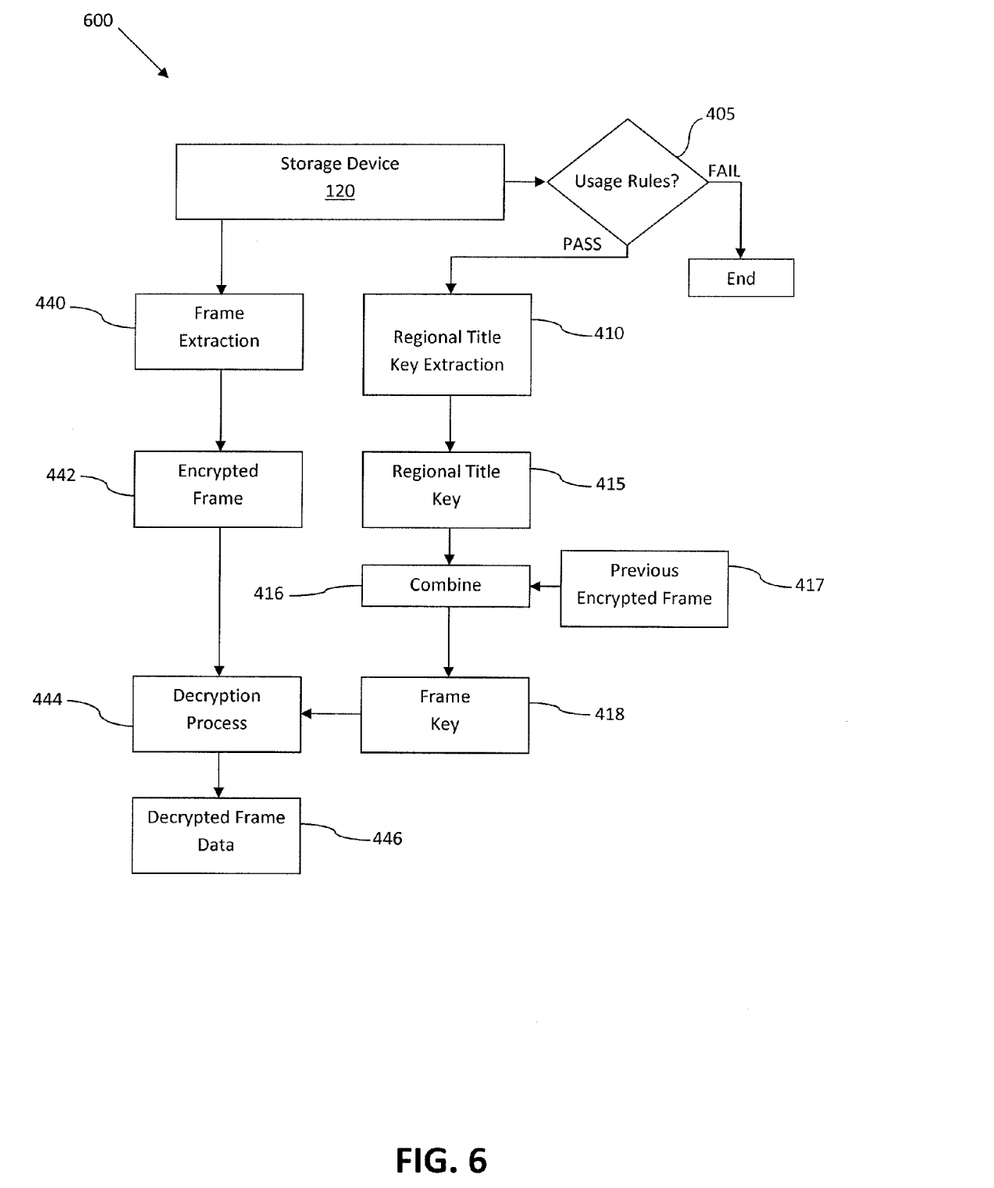
FIG. 6 is a block diagram illustrating a method for decrypting encrypted digital content according to an embodiment of the present disclosure.

FIG. 6 is a block diagram 600 illustrating a method for decrypting encrypted digital content according to an embodiment of the present disclosure. The decryption method of FIG. 6 may include operations similar to those discussed above with respect to FIG. 4. The difference between the decryption method of FIG. 6 compared with FIG. 4 is that the block diagram 600 does not include the portions pertaining to the user ID and device ID. Thus, the decryption method in FIG. 6 may be used as a decryption method for the encrypted digital content encrypted by the encryption method of FIG. 5. As a result, the regional title key 415 may not include the user ID. The encryption method of FIG. 6 does show the frame key 418 that may be generated based on the digital content itself, such as, for example, by combining the regional title key 415 with previous encrypted frames 417.

CONCLUSION

In some embodiments, a method for digital content protection is disclosed. The method comprises generating a plurality of frame keys, retrieving a plurality of frames from digital content, and at least one of encrypting and decrypting the digital content with a different frame key that dynamically changes for each frame of the plurality of frames.

In another embodiment, a storage device comprises a computer-readable medium including encrypted digital content stored thereon, wherein the encrypted digital content is encrypted with a frame key that is different for each frame of the encrypted digital content.

In yet another embodiment a content player comprises a computer-readable medium including instructions stored thereon, that when executed cause a processor to decrypt encrypted digital content by reconstructing a plurality of frame keys that are different from each other that are used to decrypt each frame of the encrypted digital content.

While the present disclosure has been described herein with respect to certain embodiments, those of ordinary skill in the art will recognize and appreciate that it is not so limited. Rather, many additions, deletions and modifications to the described embodiments may be made without departing from the scope of the disclosure as hereinafter claimed, including legal equivalents. In addition, features from one embodiment may be combined with features of another embodiment while still being encompassed within the scope of the disclosure as contemplated by the inventor.

What is claimed is:

1. A method for digital content protection, the method comprising:
   generating a plurality of frame keys;
   retrieving a plurality of frames from digital content; and
   at least one of encrypting and decrypting the digital content with a different frame key of the plurality of frame keys that dynamically changes for each frame of the plurality of frames;
   encrypting a regional title key with a user key to generate an encrypted regional title key; and
   storing the encrypted regional title key and the encrypted digital content in a storage device.

2. The method of claim 1, wherein generating the plurality of frame keys further comprises generating a frame key of the plurality of frame keys that includes using at least a portion of the digital content to contribute to the frame key.

3. The method of claim 2, wherein generating the frame key of the plurality of frame keys further includes using a previously encrypted frame for encrypting a current frame.

4. The method of claim 2, wherein generating the frame key of the plurality of frame keys further includes using a previously encrypted frame for decrypting a current encrypted frame.

5. The method of claim 2, wherein generating the frame key of the plurality of frame keys further includes combining the regional title key with the previous encrypted frame.

6. The method of claim 5, wherein generating the frame key of the plurality of frame keys further includes using the regional title key as a frame key for a frame in which no previous encrypted frame exists.

7. The method of claim 5, wherein generating the frame key of the plurality of frame keys further includes combining a regional key and a title key with a user ID to generate the regional title key.

8. The method of claim 1, further comprising:
   generating the user key by combining a device ID and a user ID; and
   storing the user ID in the storage device.

9. A storage device, comprising:
   a computer-readable medium including encrypted digital content and an encrypted regional title key stored thereon, wherein the encrypted digital content is encrypted with a frame key that is different for each frame of the encrypted digital content, and wherein the encrypted regional title key is encrypted with a user key and a combination of a regional key and a title key.

10. The storage device of claim 9, wherein the user key includes a combination of a user-specific identifier and a device-specific identifier.

11. The storage device of claim 9, wherein the regional key is associated with a region selected from the group consisting of a city, an area code, a zip code, a region served by a kiosk, and sub-regions thereof.

12. The storage device of claim 9, further comprising a portable storage device that comprises the computer-readable medium, the portable storage device selected from the group consisting of a Flash memory device, a smart phone, an eBook reader, a laptop computer, and a tablet computer.

13. The storage device of claim 9, wherein the digital content is selected from the group consisting of video content, audio content, video game content, health records, financial records, government records, and military records.

14. The storage device of claim 9, wherein the frame key is embedded with a user ID that identifies a specific user of the storage device.

15. A content player, comprising:
a computer-readable medium including instructions stored thereon, that when executed cause a processor to decrypt encrypted digital content by reconstructing a plurality of frame keys that are different from each other that are used to decrypt each frame of the encrypted digital content and an encrypted regional title key encrypted with a user key and a regional title key.

16. The content player of claim 15, wherein the instructions are stored on the computer-readable medium as a software application.

17. The content player of claim 16, wherein the instructions are stored on the computer-readable medium as a plug-in to a larger software application.

18. The content player of claim 15, wherein the plurality of different frame keys include a selected subset of data from a previous encrypted frame for decrypting a current encrypted frame.

* * * * *

UNITED STATES PATENT AND TRADEMARK OFFICE
CERTIFICATE OF CORRECTION

| | | |
|---|---|---|
| PATENT NO. | : 8,898,767 B1 | Page 1 of 1 |
| APPLICATION NO. | : 13/624726 | |
| DATED | : November 25, 2014 | |
| INVENTOR(S) | : Xi Chen and Stephen Wirthlin Gerritsen | |

It is certified that error appears in the above-identified patent and that said Letters Patent is hereby corrected as shown below:

In the specification:
COLUMN 5, LINE 37, change "a web site as" to --a website as--
COLUMN 7, LINE 19, change "during user" to --during the user--

In the claims:
CLAIM 1, COLUMN 12, LINE 30, change "content; and" to --content;--

Signed and Sealed this
Eighth Day of September, 2015

Michelle K. Lee
*Director of the United States Patent and Trademark Office*